United States Statutory Invention Registration [19]

[11] Reg. Number: H348

Panayappan [43] Published: Oct. 6, 1987

[54] PENETRATING COMPOUND FOR THE SUPPRESSION OF RUSTY-BOLT INTERMODULATION INTERFERENCE

[76] Inventor: Ramanathan Panayappan, 11709 Split Tree Cir., Potomac, Md. 20854

[21] Appl. No.: 20,217

[22] Filed: Jan. 20, 1987

Related U.S. Application Data

[63] Continuation-in-part of Ser. No. 848,423, Apr. 4, 1986, abandoned.

[51] Int. Cl.[4] ..... C09K 3/00; C23F 11/18

[52] U.S. Cl. ..... 106/14.14; 252/389.4

*Primary Examiner*—Matthew A. Thexton

*Attorney, Agent, or Firm*—Robert. F. Beers; Robert W. Adams; Edward V. Hiskes

EXEMPLARY CLAIM

A chemical composition suitable for reducing intermodulation interference, and which also possesses improved penetrating qualities, contains the following:

| | % by weight |
|---|---|
| Polyvinylpyrrolidinone (PVP-K-90) | 10 |
| Citric Acid | 10 |
| Tetrasodium salt of EDTA | 5 |
| Sodium Bicarbonate | 5 |
| Erythorbic Acid | 50 |
| Sodium Tetraborate Decahydrate | 7.5 |
| Sodium Laurylsulfate | 2.5 |
| Water | 5 |
| Ethylene Glycol | 5 |

1 Claim, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PENETRATING COMPOUND FOR THE SUPPRESSION OF RUSTY-BOLT INTERMODULATION INTERFERENCE

This application is a continuation-in-part of application Ser. No. 848,423, filed Apr. 4, 1986, now abandoned.

BACKGROUND OF THE INVENTION

Intermodulation interference (IMI) from metal-oxide-metal non-linear junctions near HF transmitters and receivers is a serious problem aboard ships and in other places where the radio equipment is operated in the vicinity of metal objects which may have corroded junctions.

Numerous means for suppression have been proposed. Most involve the use of mechanical disassembly of the offending corroded metal junctions or the use of cleaning compounds that require mechanical disassembly before they can be properly applied. The current invention is a composition which effectively penetrates corroded junctions and chemically modifies them so that IMI is eliminated and prevented from reoccuring.

SUMMARY OF THE INVENTION

One object of this invention is to provide an improved IMI suppression composition that eliminates the need for mechanical disassembly of corroded metal junctions.

Another object of this invention is to provide an IMI suppression composition that is chemically compatible with ingredients that both penetrate the metal junction and form a lasting film that will prevent reoxidation of the junction.

These and other objects are achieved with a composition comprising a polymer, a chelating agent such as EDTA, citric acid, sodium bicarbonate, sodium tetraborate, sodium laural sulfate, water, ethelene glycol, and erythrobic acid.

DETAILED DESCRIPTION OF THE INVENTION

A chemical composition suitable for reducing intermodulation interference, and which also possesses improved penetrating qualities, contains the following:

| | % by weight |
|---|---|
| Polyvinylpyrrolidinone (PVP-K = 90) | 10 |
| Citric Acid | 10 |
| Tetrasodium salt of EDTA | 5 |
| Sodium Bicarbonate | 5 |
| Erythorbic Acid | 50 |
| Sodium Tetraborate Decahydrate | 7.5 |
| Sodium Laurylsulfate | 2.5 |
| Water | 5 |
| Ethylene Glycol | 5 |

These chemicals are simply mixed at room temperature and normal pressure. The result is a viscous solution which is applied by painting or spraying on the rusty-bolt junctions.

What I claim is:

1. A composition comprising the following:

| | % by weight |
|---|---|
| Polyvinylpyrrolidinone (PVP-K-90) | 10 |
| Citric Acid | 10 |
| Tetrasodium salt of EDTA | 5 |
| Sodium Bicarbonate | 5 |
| Erythorbic Acid | 50 |
| Sodium Tetraborate Decahydrate | 7.5 |
| Sodium Laurylsulfate | 2.5 |
| Water | 5 |
| Ethylene Glycol | 5 |

* * * * *